(12) United States Patent
Bell et al.

(10) Patent No.: US 7,131,667 B2
(45) Date of Patent: Nov. 7, 2006

(54) SEAT BELT PRETENSIONER

(75) Inventors: John Bell, Carlisle (GB); Brian A. Jack, Dumfiesshire (GB)

(73) Assignee: Key Safety Systems, Inc., Sterling Heights, MI (US)

( * ) Notice: Subject to any disclaimer, the term of this patent is extended or adjusted under 35 U.S.C. 154(b) by 3 days.

(21) Appl. No.: 11/145,766

(22) Filed: Jun. 6, 2005

(65) Prior Publication Data

US 2005/0275210 A1    Dec. 15, 2005

Related U.S. Application Data

(63) Continuation-in-part of application No. 10/874,911, filed on Jun. 24, 2004.

(30) Foreign Application Priority Data

Jun. 11, 2004    (EP) ............... 04253510.4

(51) Int. Cl.
B60R 21/36    (2006.01)
(52) U.S. Cl. .................................... 280/806
(58) Field of Classification Search ............. 280/801.1, 280/801.2, 806; 297/216.15, 216.16, 216.17, 297/216.18, 216.19, 470, 471, 472
See application file for complete search history.

(56) References Cited

U.S. PATENT DOCUMENTS

| | | |
|---|---|---|
| 5,374,110 A | 12/1994 | Hiramatsu |
| 5,397,075 A | 3/1995 | Behr |
| 5,564,748 A | 10/1996 | Kmiec et al. |
| 5,639,120 A | 6/1997 | Kmiec et al. |
| 5,887,897 A | 3/1999 | Gill et al. |
| 5,911,440 A | 6/1999 | Ruddick et al. |
| 5,944,350 A | 8/1999 | Grabowski et al. |
| 5,967,440 A | 10/1999 | Marshall |
| 5,971,488 A | 10/1999 | Pedronno et al. |
| 6,036,274 A | 3/2000 | Kohlndorder et al. |
| 6,039,353 A | 3/2000 | Bauer et al. |
| 6,113,145 A | 9/2000 | Evans |
| 6,142,524 A | 11/2000 | Brown et al. |
| 6,193,296 B1 | 2/2001 | Motozawa et al. |
| 6,213,511 B1 | 4/2001 | Downie et al. |
| 6,213,513 B1 | 4/2001 | Grabowski et al. |
| 6,238,003 B1 | 5/2001 | Miller, III et al. |
| 6,419,271 B1 | 7/2002 | Yamada et al. |
| 2002/0043796 A1 | 4/2002 | Webber et al. |
| 2003/0029661 A1 | 2/2003 | Motozawa |
| 2003/0090101 A1 | 5/2003 | Ennerdal |

(Continued)

FOREIGN PATENT DOCUMENTS

FR    2 765 537 A    1/1999

(Continued)

*Primary Examiner*—Faye M. Fleming
(74) *Attorney, Agent, or Firm*—Lonnie R. Drayer

(57) ABSTRACT

A pretensioner for a three point vehicle safety restraint seat belt, has a mounting for one end of the seat belt. The mounting is a first member fixed to a load bearing part of the vehicle. A second member is attached to the end of the seat belt. A means is provided for moving the second member relative to the first member in a pretensioning direction in response to activation of a crash sensor. The mounting may be a flexible cable that functions as a slider bar. A piston-cylinder force reservoir may be used either to pull the slider bar via a carriage mounted on a rail, or to pull the cable directly. Return motion is preferably inhibited. The arrangement provides a space saving pretensioner suitable for two-door vehicles while allowing access to the vehicle rear.

14 Claims, 4 Drawing Sheets

U.S. PATENT DOCUMENTS

| | | |
|---|---|---|
| 2003/0122362 A1 | 7/2003 | Ukita et al. |
| 2003/0230661 A1 | 12/2003 | Bell et al. |
| 2004/0046382 A1 | 3/2004 | Ball et al. |

FOREIGN PATENT DOCUMENTS

| | | |
|---|---|---|
| JP | 01-285438 | 11/1989 |
| JP | 02-147454 | 6/1990 |
| JP | 3153441 | 7/1991 |
| JP | 50-35815 | 2/1993 |
| JP | 5085306 | 4/1993 |
| JP | 5105029 | 4/1993 |
| JP | 7196011 | 8/1995 |
| JP | 2001163179 | 6/2001 |
| JP | 2001213277 | 8/2001 |
| JP | 2001247010 | 9/2001 |
| JP | 2001301565 | 10/2001 |
| JP | 2002145013 | 5/2002 |
| JP | 2002211352 | 7/2002 |
| JP | 2002211353 | 7/2002 |
| JP | 2002211354 | 7/2002 |
| JP | 2002308045 | 10/2002 |
| JP | 2002337660 | 11/2002 |
| JP | 2002362311 | 12/2002 |
| JP | 2003025939 | 1/2003 |
| JP | 2003054360 | 2/2003 |
| JP | 2003081053 | 3/2003 |
| JP | 2003127829 | 5/2003 |
| WO | WO 95/31359 A | 11/1995 |

SEAT BELT PRETENSIONER

This is a Continuation-in-Part of application Ser. No. 10/874,911 filed Jun. 24, 2004.

FIELD OF THE INVENTION

The present invention relates to a seat belt pretensioner that can be used in a vehicle.

BACKGROUND OF THE INVENTION

Traditionally a seat belt comprises a length of seat belt webbing connected at three points to load bearing parts of a vehicle. Typically one end is bolted to a door sill on one side of the seat, and is arranged to pass laterally across the hips of the vehicle occupant to a buckle mechanism fixed to the vehicle on the opposite side of the seat, and then diagonally across the torso of the vehicle occupant to a further fastening point on the B pillar of the door. The buckle mechanism engages a buckle tongue slideably attached to the webbing.

To increase the comfort of the vehicle occupant restrained by the seat belt a retractor is attached to the pillar end of the webbing. This allows the webbing to pay out under relatively low loads to enable limited movement of the vehicle occupant, for example to reach in-car entertainment controls or storage compartments. The retractor is biased to keep the webbing relatively taut about the vehicle occupant and a locking element is included to lock the retractor against webbing pay out in the event of a crash being detected. For example, an acceleration sensor activates if the vehicle undergoes rapid acceleration or deceleration indicative of a crash.

In recent years, pretensioners have been introduced to rapidly pull in a length of seat belt webbing to tighten the seat belt about the vehicle occupant in of a crash. This takes up any slack that may have developed in the seat belt and helps to more correctly position the vehicle occupant in the seat to maximize the effect of the seat belt protection and of any secondary safety restraint such as an airbag.

Pretensioners comprise a force reservoir such as a pyrotechnically operated gas generator to provide an impulse of sufficient magnitude to tighten the seat belt in a short space of time, ideally before the crash takes full effect. A typical known pretensioner may use rotational means to wind in a length of seat belt webbing, for example by rotating the retractor spool in a webbing rewind direction to take in the required length of webbing prior to the retractor locking against webbing pay out.

However, known pretensioners tend to be bulky, and are particularly difficult to use for the driver and front passenger seats of a two door vehicle because of the requirement to allow access to the rear of the vehicle past the front seats. Using a traditional retractor pretensioner mechanism in a front seat of a two door vehicle causes an unacceptable obstruction.

Seat travel is greater in a two door vehicle than in a four door vehicle to provide access to the rear seat and to accommodate this the door sill end of the webbing is usually attached to a so-called slider bar of well known design, instead of being bolted to the floor. This allows the sill end of the webbing to be moved longitudinally forward and rearward to facilitate rear seat access and front seat movement. The present invention provides an improved pretensioning mechanism that can be used in two-door, front seat applications.

SUMMARY OF THE INVENTION

According to the present invention there is provided a pretensioner for a two point vehicle safety restraint seat belt, comprising a mounting for one end of the seat belt, the mounting comprising a first member fixed to a load bearing part of the vehicle and a second member attached to the end of the seat belt, and means for moving the second member translationally relative to the first member in a pretensioning direction in response to activation of a crash sensor.

DETAILED DESCRIPTION OF THE INVENTION

Figure 1:
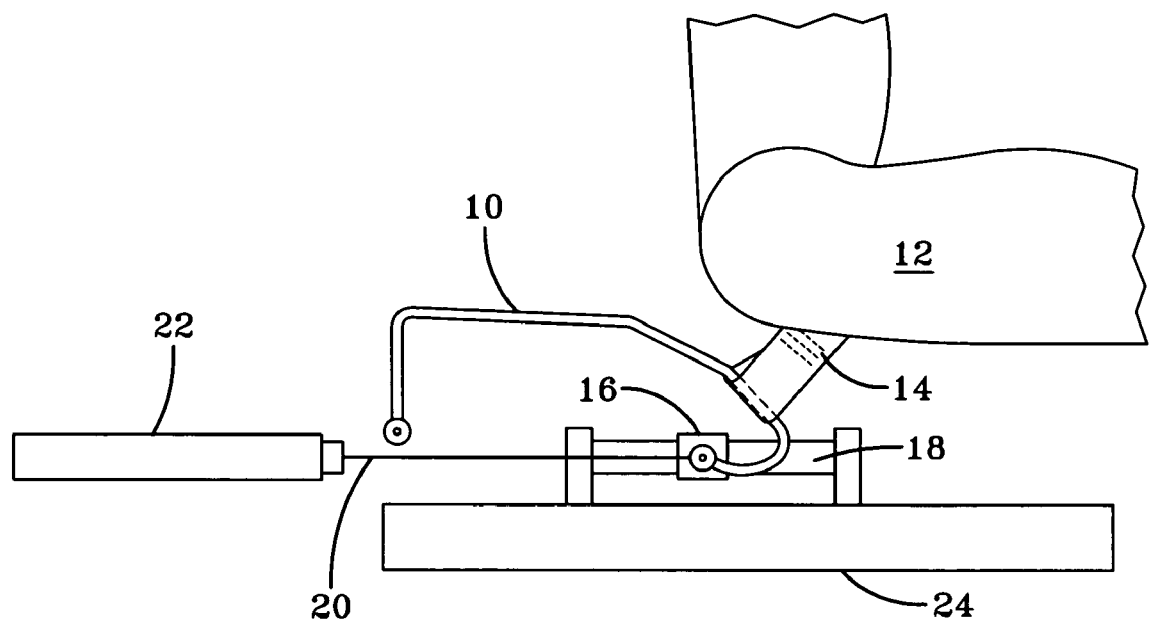
FIG. 1 is a side elevation view of a pretensioner according to a first embodiment of the present invention.

In the first embodiment shown in FIG. 1, a slider bar 10 is positioned near to a front seat 12 of a vehicle. One end of a seat belt webbing 14 passes around the slider bar 10 and is free to move back and forth along the slider bar 10.

The seat belt webbing 14 is of a conventional design and is attached at one end to a retractor mounted, near a to seat, to a load bearing part of the vehicle such as a vehicle side pillar (not shown). The webbing passes through a shoulder support also attached to the side pillar and has a buckle tongue, which is insertable into a buckle (not shown) located on the other side of the seat.

When in use, the seat belt webbing 14 is at one end of the slider bar 10 in the load bearing position shown in FIG. 1. When the seat belt is not in use the end of the webbing 14 may be moved in a rearward direction along the slider bar 10 so that it does not obstruct access to the rear seat of the vehicle.

One end of the slider bar 10 is attached to a carriage 16 that is mounted on a rail 18. The use of a rail is particularly beneficial since the pretensioning action can be constrained to a linear motion in one direction in a simple manner and without the need for complicated or bulky rotating parts. A cable 20 extends between the carriage 16 and a pyrotechnic unit 22. The pyrotechnic unit 22 is of a known type and contains a piston within a cylindrical housing and a gas generator. The gas generator is pyrotechnically activated to provide an impulse that forces the piston in a rearward direction and tensions the cable 20. Such a pyrotechnic unit is particularly suited to this application since it provides an impulse of the required magnitude over a short time period. Positioning the piston and cylinder below the rail advantageously reduces the overall size of the pretensioner. The piston-cylinder arrangement may incorporate means to allow the second member to only move in a pretensioning direction, for example by ratchet teeth on the inside of the cylinder and at least one cooperating tooth on the piston.

Figure 2:
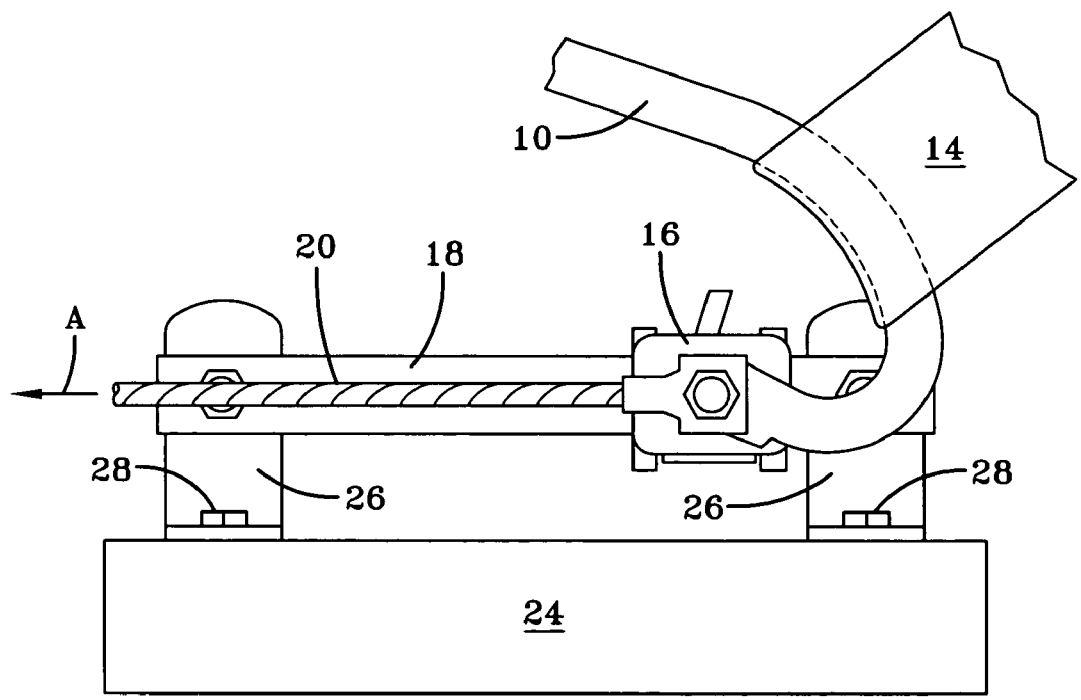
FIG. 2 is an enlarged side elevation view of part of the pretensioner of FIG. 1 before pretensioning.

FIG. 2 shows one arrangement of the carriage 16 and the rail 18 in greater detail. The rail 18 is attached at each end to support members 26 that are fixed to a load bearing chassis member 24 by bolts 28. The load bearing chassis member 24 may be a chassis member extending in a longitudinal direction down each side of the vehicle, or a load bearing door sill and provides a suitable load bearing anchorage zone for the slider bar 10 adjacent to and slightly to the rear of each of the vehicle doors.

Prior to pretensioning, the carriage 16 is positioned for normal use of the seat belt webbing 14 at its forward most position on the rail 18 as shown in FIG. 2. Upon sensing an acceleration of the vehicle above a predetermined criterion, a crash sensor, in a known manner, generates a signal indicative of a crash that causes the pyrotechnic unit 22 to fire, creating a tension in the metal cable 20. The tension in the cable 20 pulls the carriage 16 and the slider bar 10 in a rearward direction i.e. the direction indicated by the arrow A in FIG. 2. The carriage 16 can be arranged to move rearwardly a distance in the range of about 50 mm to about 150 mm depending on the vehicle size and performance requirements.

The sudden movement of the slider bar 10 in a rearward direction provides tension in the seat belt webbing 14, which takes up any slack in the webbing 14 and pulls a vehicle occupant backwards into the seat 12 to correctly position the vehicle occupant in the seat 12 to maximize the benefit of the seat belt and correctly position the vehicle occupant for maximum effect of any secondary restraint such as an airbag.

Figure 3:
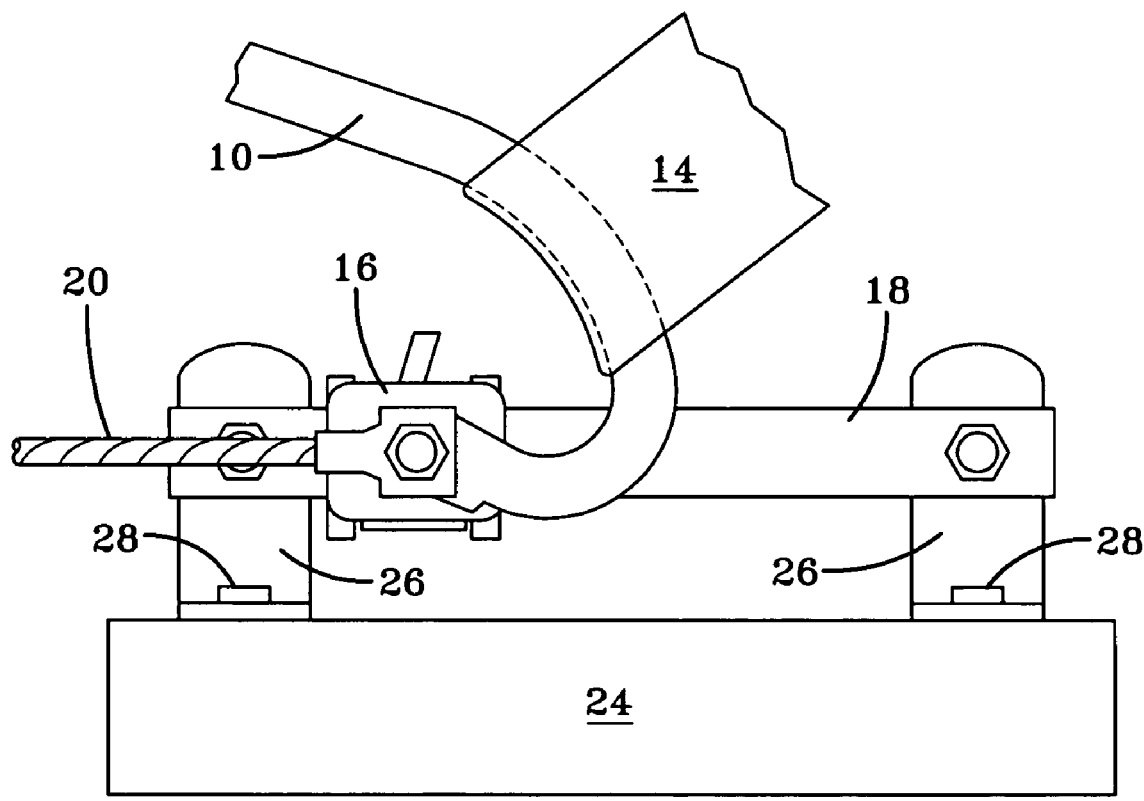
FIG. 3 is an enlarged side elevation view of part of the pretensioner of FIG. 1 after pretensioning.
Figure 5:
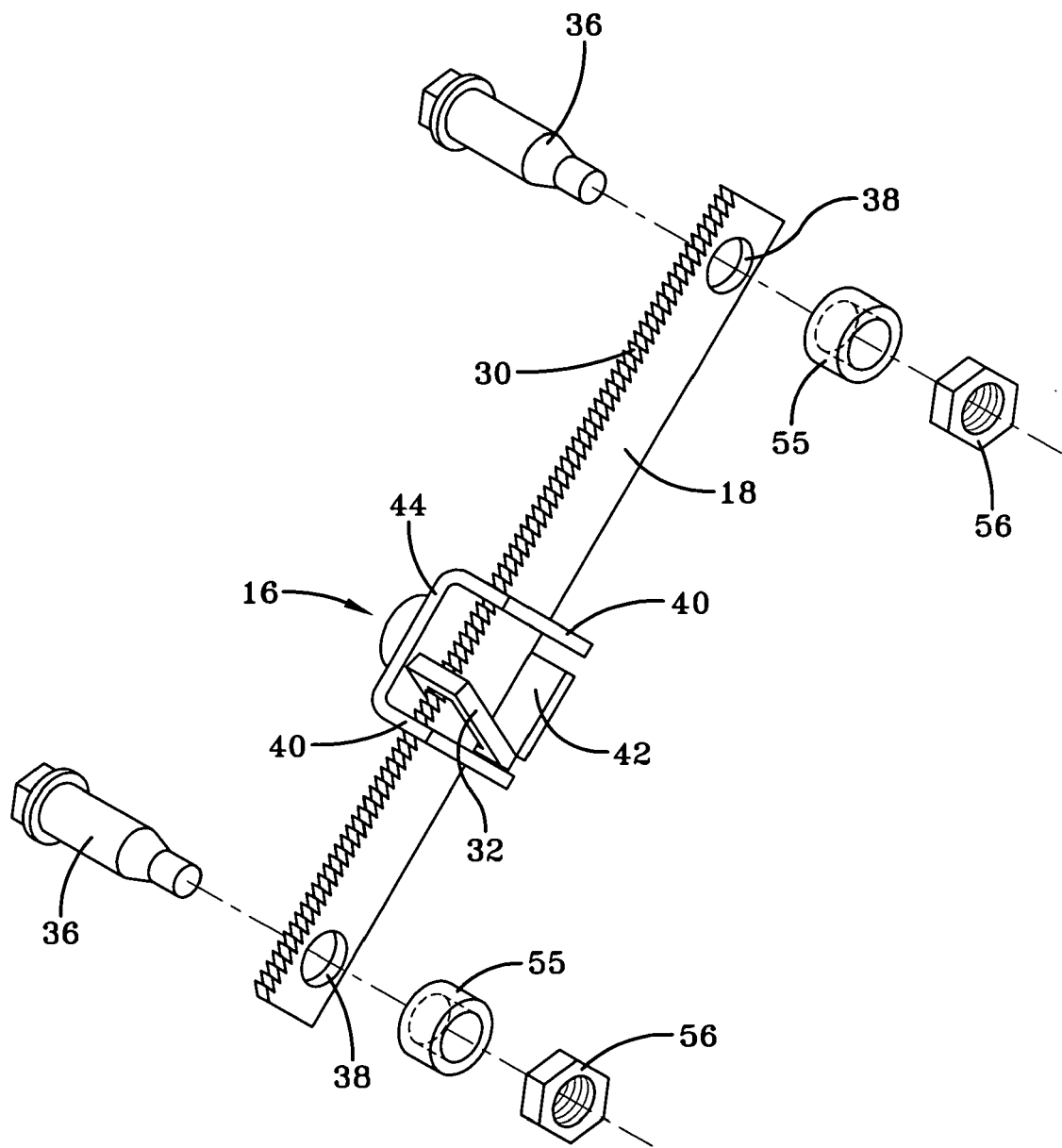
FIG. 5 is an exploded perspective view of the carriage and rail arrangement of FIG. 1.

FIG. 3 shows the position of the carriage 16 immediately after pretensioning. After the pyrotechnic unit has fired, the carriage 16 is prevented from returning to its original position by the forward momentum of the vehicle occupant during a crash, by a ratchet mechanism within the carriage. Locking the pretensioner against return movement in this way prevents a loss of tension in the seat belt after pretensioning has been carried out In FIG. 5 is an exploded view showing the ratchet mechanism. The rail 18 is attached at each of its ends to respective support members 26 by bolts 36 passing through cylindrical holes 38 at each end of the rail 18. The bolts 36 are secured with appropriate washers or spacers 55 and nuts 56. Locking ratchet teeth 30 are formed in one surface of the rail 18. The carriage 16 has two end plates 40 and a base plate 42 attached to a side wall 44. A locking lever 32 extends from the base plate 42. Each of the end plates 40 and the locking lever 32 have a slot, allowing the rail 18 to pass through the center of the carriage 16.

An inner surface of the locking lever 32 is in contact with the teeth 30 on the surface of the rail 18 and is orientated at an angle such that the locking lever 32 can pass over the teeth 30 in one direction. However the locking lever 32 is biased such that if it tries to move in the opposite direction, a locking edge of the inner surface of the locking lever 32 will be caught against a tooth 30 on the upper surface of the rail 18 and prevent the carriage 16 from sliding in a reverse direction. To facilitate this the teeth 30 have a saw-tooth form.

The slider bar 10, the carriage 16 and ratchet mechanism, the rail 18, the support members 26 and the bolts 28, 36 and 46 are all preferably made of metal. Ratchet mechanisms are known for different seat belt restraint applications and so the pretensioner of the present invention can advantageously be constructed using standard parts and manufacturing processes, and thus offers a relatively low cost locking mechanism. The ratchet mechanism and the carriage 16 may be formed from parts of a height adjuster traditionally used to alter the height of the belt shoulder support.

Figure 4:
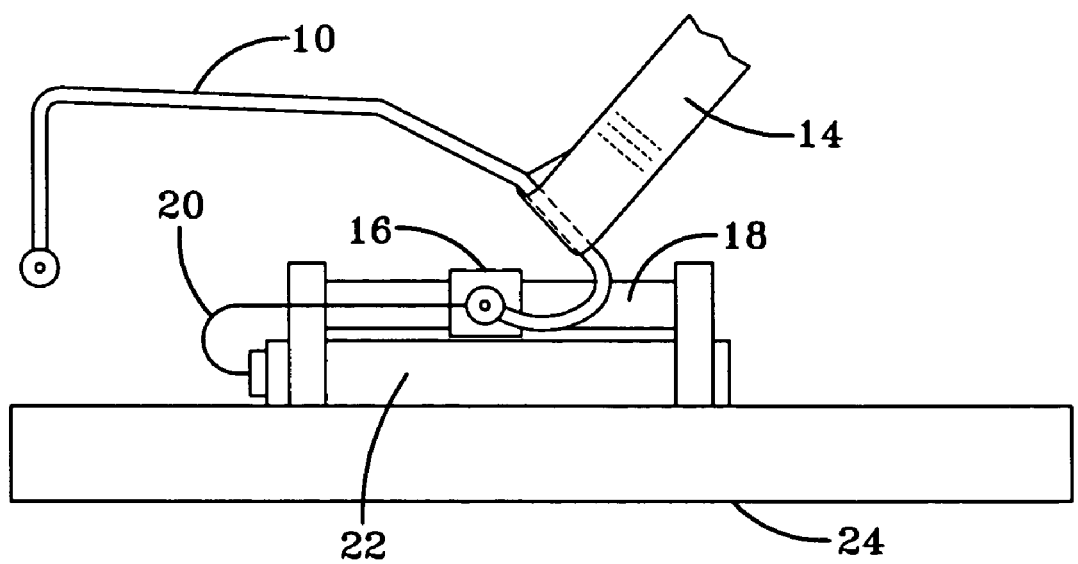
FIG. 4 is a side elevation view of an alternative embodiment of the pretensioner of FIG. 1.

In FIG. 4 the pyrotechnic unit is shown stored beneath the rail 18 and the bolts 36 and corresponding holes 38 in the rail may be used to fix the pyrotechnic unit 22 in relation to the rail 18. The operation of the pretensioner in FIG. 4 is substantially the same as that shown in FIG. 1, except that the cable 20 bends 180° to cater for the different orientation of the pyrotechnic unit 22.

Figure 6:
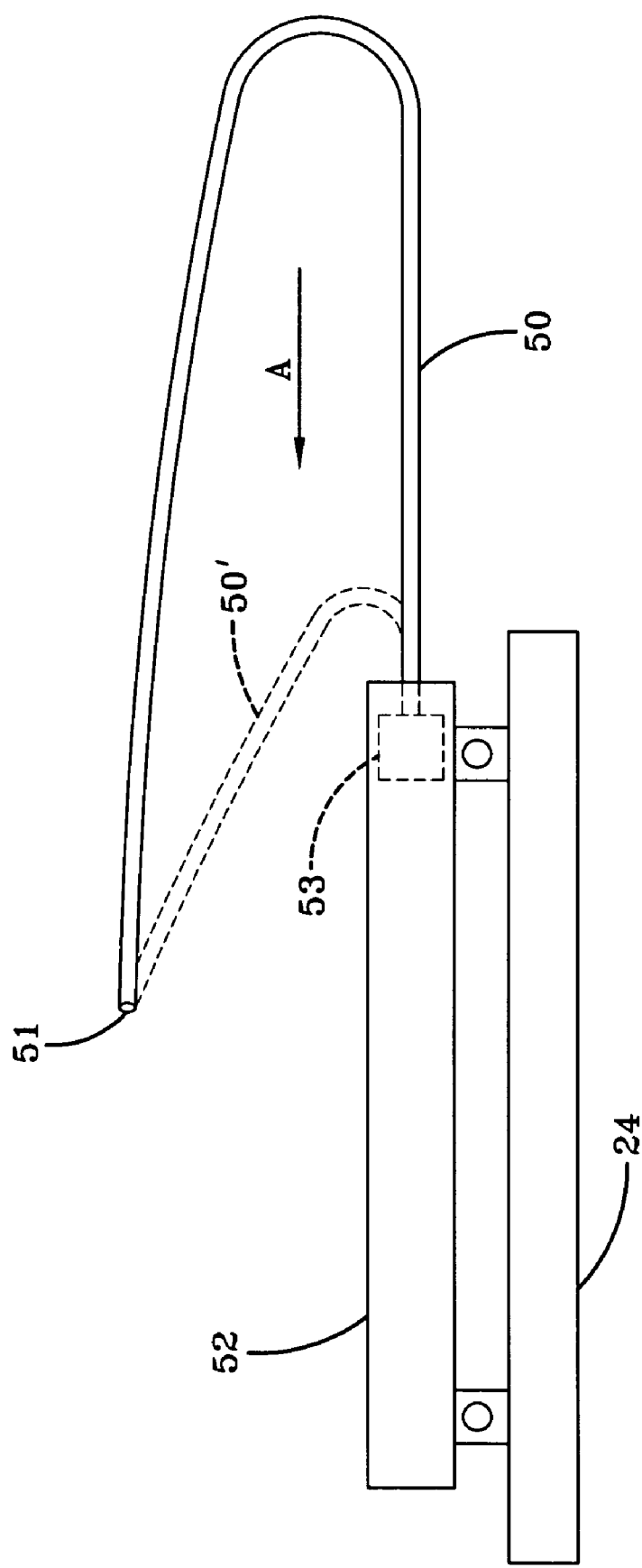
FIG. 6 is a side elevation view of a pretensioner according to a third embodiment of the present invention.

FIG. 6 shows an alternative embodiment in which the slider bar of the first embodiment is replaced by a flexible cable 50. The flexible cable 50 thus preferably form a loop, in the general form of a slider bar, to provide the flexibility of movement for the seat belt webbing and access to the rear of a vehicle, required in two door vehicle applications. The flexible cable may be directly attached to, or form at least a part of, the piston of the piston-cylinder arrangement which is preferably operated pyrotechnically. Thus this embodiment can provide an even more space saving alternative for two-door applications of pretensioners.

The seat belt webbing (not shown) is looped round the cable 50 in the same manner as with the slider bar 10 of FIG. 1 and the cable provides similar versatility of movement for the webbing mounting, and at least the same degree of access to rear seats.

One end 51 of the cable 50 is attached to a load bearing part of the vehicle such as the door sill, and the other end is attached to a piston 53 of a piston-cylinder pyrotechnic unit 52 which is fixed to a load bearing part of the vehicle such as the floor of the vehicle, particularly to retain the door profile and avoid inhibiting access through the door.

The cable 50 forms a loop profile as shown in the figure and can be encouraged to hold such a profile in normal use by retaining clips or by an elastomeric plastic coating. Alternatively a flexible tube may cause the cable 50 to increase its stiffness to the appropriate degree.

When a crash sensor indicates that a sudden deceleration or acceleration is taking place, the pyrotechnic unit 52 is pyrotechnically activated to release gas to push the piston along the cylinder in the direction indicated by the arrow A, causing the cable 50 to retract to the profile indicated by the broken line 50'. This causes the seat belt webbing mounted on the cable 50 to be pulled back in the direction indicated by the arrow A thus effecting the required pretensioning.

A ratchet or another form of non-return mechanism may be built into the pyrotechnic unit 52.

Of course elements of the embodiments described may be combined. For example the cable 50 could be attached to an arrangement such as the carriage 16 sliding on the rail 18, of FIG. 1. The pyrotechnic unit 52 could then be connected to the carriage 16 by another cable such as 20 in FIG. 1 and be mounted either in line with, or below, the rail 18.

Pretensioners can be constructed according to the invention having reduced or eliminated obstruction to rear seat access, smaller package sizes and which are attached to an appropriate door sill anchorage zone.

It is understood that the invention is not limited to the particular construction and arrangement of parts herein illustrated and described, but embraces all such modified forms thereof as come within the scope of the following claims.

The invention claimed is:

1. A pretensioner for a three point seat belt, comprising:
 a mounting for one end of the seat belt, the mounting comprising a first member adapted to be fixed to a load bearing part of the vehicle and a second member comprising a flexible member connecting the second member to the end of the seat belt webbing and having one end mounted to a fixed part of the vehicle, the flexible member functioning as a slider bar; and means for moving the second member translationally relative to the first member in a pretensioning direction in response to activation of a crash sensor, the first member comrprising a rail and the second member comprising a carriage mounted for sliding movement on the rail.

2. The pretensioner for a three point seat belt according to claim 1 wherein the flexible member comprises a cable arranged in a loop form profile.

3. The pretensioner for a three point seat belt according to claim1 wherein the means for moving comprises a piston connected to the second member and a cylinder housing the piston such that pyrotechnic activation of the means for moving the piston along the cylinder.

4. The pretensioner for a three point seat belt according to claim 2 wherein the means for moving comprises a piston connected to the second member and a cylinder housing the piston such that pyrotechnic activation of the means for moving the piston along the cylinder.

5. The pretensioner for a three point seat belt according to claim 2 wherein the cable is held by releasable clips in a loop form profile.

6. The pretensioner for a three point seat belt according to claim 2 wherein the cable is coated with an elastomeric plastic material.

7. The pretensioner for a three point seat belt according to claim 2 wherein the cable is enclosed in a tube of an elastomeric plastic material.

8. The pretensioner for a three point seat belt according to claim 3 wherein the piston and the cylinder are located above the rail.

9. The pretensioner for a three point seat belt according to claim 4 wherein the piston and the cylinder are located above the rail.

10. A pretensioner for a three point seat belt according to claim 1 wherein the first member comprises means for restraining motion of the second member in a non-pretensioning direction, the restraining means comprising ratchet teeth incorporated in the first member and at least one cooperating tooth incorporated in the second member.

11. A pretensioner for a three point seat belt, comprising:
a mounting for one end of the seat belt, the mounting comprising a first member adapted to be fixed to a load bearing part of the vehicle and a second member comprising a cable arranged in a loop, in the general form of a slider bar, connecting the second member to the end of the seat belt webbing and having one end mounted to a fixed part of the vehicle, the flexible member functioning as a slider bar; and
a means for moving the second member translationally relative to the first member in a pretensioning direction in response to activation of a crash sensor, the means for moving comprising a piston connected to the second member and a cylinder housing the piston such that pyrotechnic activation of the means for moving moves the piston along the cylinder;

the first member comprising a rail having ratchet teeth and the second member comprising a carriage mounted for sliding movement on the rail, the carriage having at least one cooperating tooth for restraining motion of the second member in a non-pretensioning direction.

12. A pretensioner for a three point seat belt, comprising:
(a) a mounting for one end of the seat belt, the mounting comprising
(i) a rail having ratchet teeth adapted to be fixed to a load bearing part of the vehicle;
(ii) a carriage mounted for sliding movement on the rail, the carriage having at least one cooperating tooth for restraining motion of the second member in a non-pretensioning direction;
(iii) a flexible cable arranged in a loop in the general form of a slider bar, the cable being reinforced by an elastomeric plastic, the cable connecting the carriage to the end of the seat belt webbing and having one end mounted to a fixed part of the vehicle, the flexible cable functioning as a slider bar; and
(b) a means for moving the carriage translationally relative to the rail in a pretensioning direction in response to activation of a crash sensor, the means for moving comprising a piston connected to the second member and a cylinder housing the piston such that pyrotechnic activation of the means for moving moves the piston along the cylinder.

13. The pretensioner for a three point seat belt according to claim 12 wherein the piston and the cylinder are located above the rail.

14. A pretensioner for a three point seat belt, comprising:
a mounting for one end of the seat belt, the mounting comprising a first member adapted to be fixed to a load bearing part of the vehicle and a second member comprising a flexible member connecting the second member to the end of the seat belt webbing and having one end mounted to a fixed part of the vehicle, the flexible member functioning as a slider bar; and means for moving the second member translationally relative to the first member in a pretensioning direction in response to activation of a crash sensor, the first member comprising means for restraining motion of the second member in a non-pretensioning direction, the restraining means comprising ratchet teeth incorporated in the first member and at least one cooperating tooth incorporated in the second member.

\* \* \* \* \*